(12) United States Patent
Randmae

(10) Patent No.: US 6,220,263 B1
(45) Date of Patent: Apr. 24, 2001

(54) PORTABLE PROTECTIVE ENCLOSURE FOR A VEHICLE

(75) Inventor: Rein S. Randmae, Fort Salonga, NY (US)

(73) Assignee: William J. Weiner, Los Gatos, CA (US)

( * ) Notice: Subject to any disclaimer, the term of this patent is extended or adjusted under 35 U.S.C. 154(b) by 0 days.

(21) Appl. No.: 09/474,143

(22) Filed: Dec. 29, 1999

(51) Int. Cl.7 .............................. E04B 1/34; E04H 15/36
(52) U.S. Cl. .................... 135/87; 135/88.05; 135/115; 135/124; 52/2.11; 52/2.18
(58) Field of Search .................... 52/2.11, 2.18; 135/124, 87, 88.05, 115

(56) References Cited

U.S. PATENT DOCUMENTS

| | | | |
|---|---|---|---|
| 3,198,200 | * | 8/1965 | Sanders ................................. 52/2.18 |
| 3,463,174 | * | 8/1969 | Heller . |
| 3,474,803 | * | 10/1969 | Davis .................................. 135/124 |
| 4,991,363 | * | 2/1991 | Randmae .............................. 52/2.11 |
| 5,595,203 | * | 1/1997 | Espinosa .............................. 135/124 |

\* cited by examiner

*Primary Examiner*—Robert Canfield
(74) *Attorney, Agent, or Firm*—Collard & Roe, P.C.; Christopher B. Garvey

(57) ABSTRACT

An improved inflatable protective fabric enclosure for an automobile. The enclosure has a base frame for stabilizing and locating the enclosure. The improvement includes the following features. One or more hoops support the fabric. Each hoop has two ends. Frame clips attach the hoop ends to the base frame. Each frame clip has a pintle for engaging each end of the hoop. An upper portion of fabric of the enclosure has hoop loops, for locating and stabilizing the hoop at a top of the hoop's arc.

5 Claims, 8 Drawing Sheets

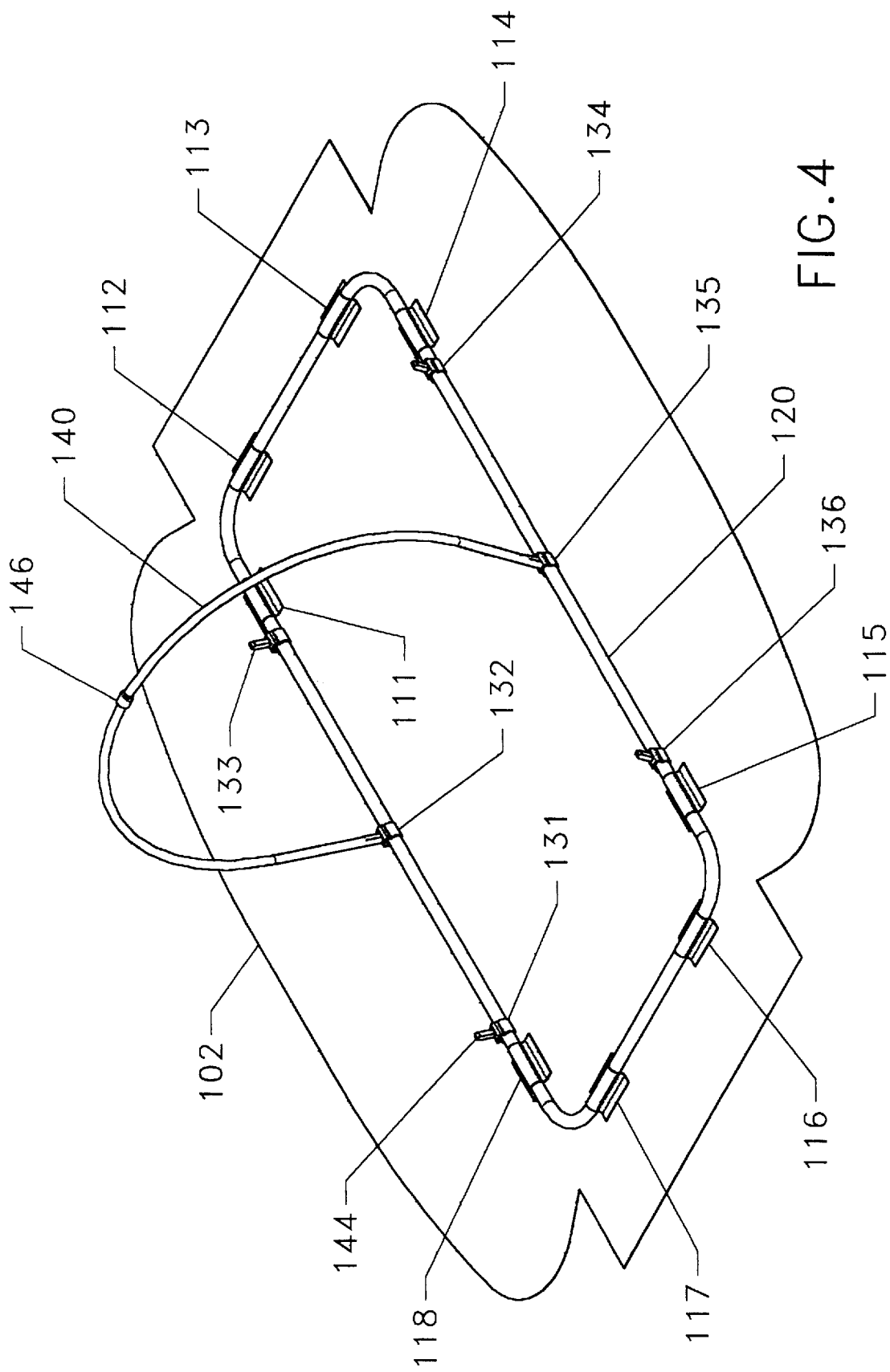

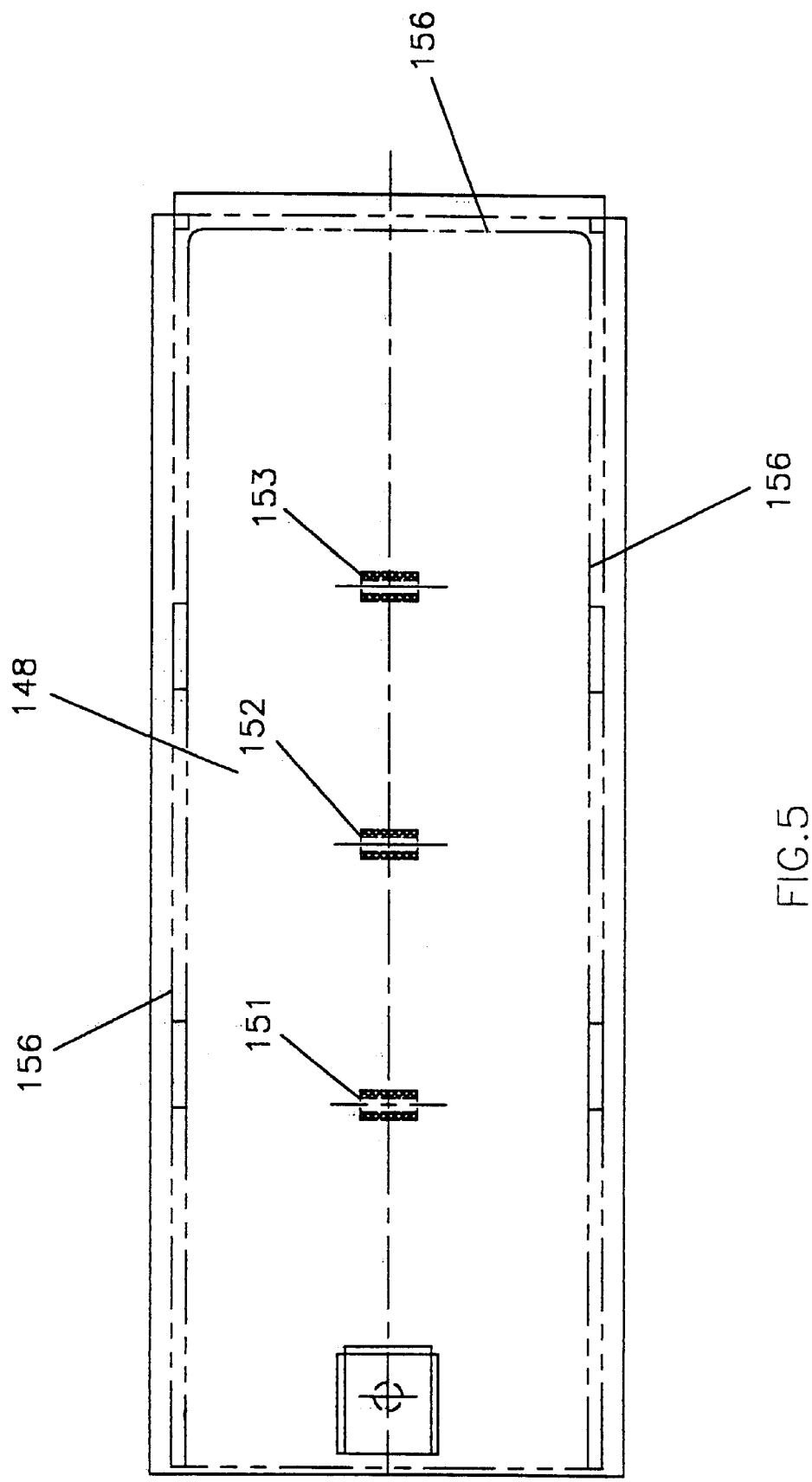

PORTABLE PROTECTIVE ENCLOSURE FOR A VEHICLE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to means of enclosing a vehicle, such an automobile, a truck, or the like for the purpose of protecting it from the destructive elements of the environment; for example, moisture, acid rain, sunlight, dust and dirt. More particularly, the invention relates to an inflatable structure, further reinforced by hoops to carry additional snow loads.

2. Description of the Related Art

To the best of the inventor's knowledge, his own U.S. Pat. No. 4,991,363 issued Feb. 12, 1991 for portable protective enclosure for a vehicle to Rein Randmae provides the closest reference.

We hereby incorporate the '363 patent by reference.

The '363 patent refers to a pressurized air-supported enclosure for the protection of a stored vehicle, the enclosure comprising a flexible sheeting totally surrounding, but not touching the vehicle. Access into the enclosure is gained by a slide fastener which extends around three sides of the enclosure. The enclosure is ventilated by a blower to minimize temperature differentials between its interior and exterior, therefore also minimizing the formation of condensation in its interior. The air blown into the enclosure is preferably filtered to minimize dust.

In some climates extremely heavy snow loads can accumulate on the top of this enclosure and overcome the pressure provided by the air inside. The fabric of the structure then sinks and contacts the vehicle, until the load has been shed. Contact with the vehicle paint is undesirable.

BRIEF SUMMARY OF THE INVENTION

The present invention seeks to remedy the snow load problem of the '363 patent by providing additional structure to support such snow loads and keep the enclosure material out of contact with the protected vehicle. It does so by providing a plurality of flexible hoops, secured to a base structure. The hoops also support the structure if the pressurizing blower fails.

BRIEF DESCRIPTION OF THE SEVERAL VIEWS OF THE DRAWINGS

FIG. 4 is a perspective view of the pattern of FIG. 3 with a base frame in place.

FIG. 5 is a bottom plan view of a flat pattern for the top section, of an embodiment of the present invention.

DETAILED DESCRIPTION OF THE INVENTION

Figure 1:
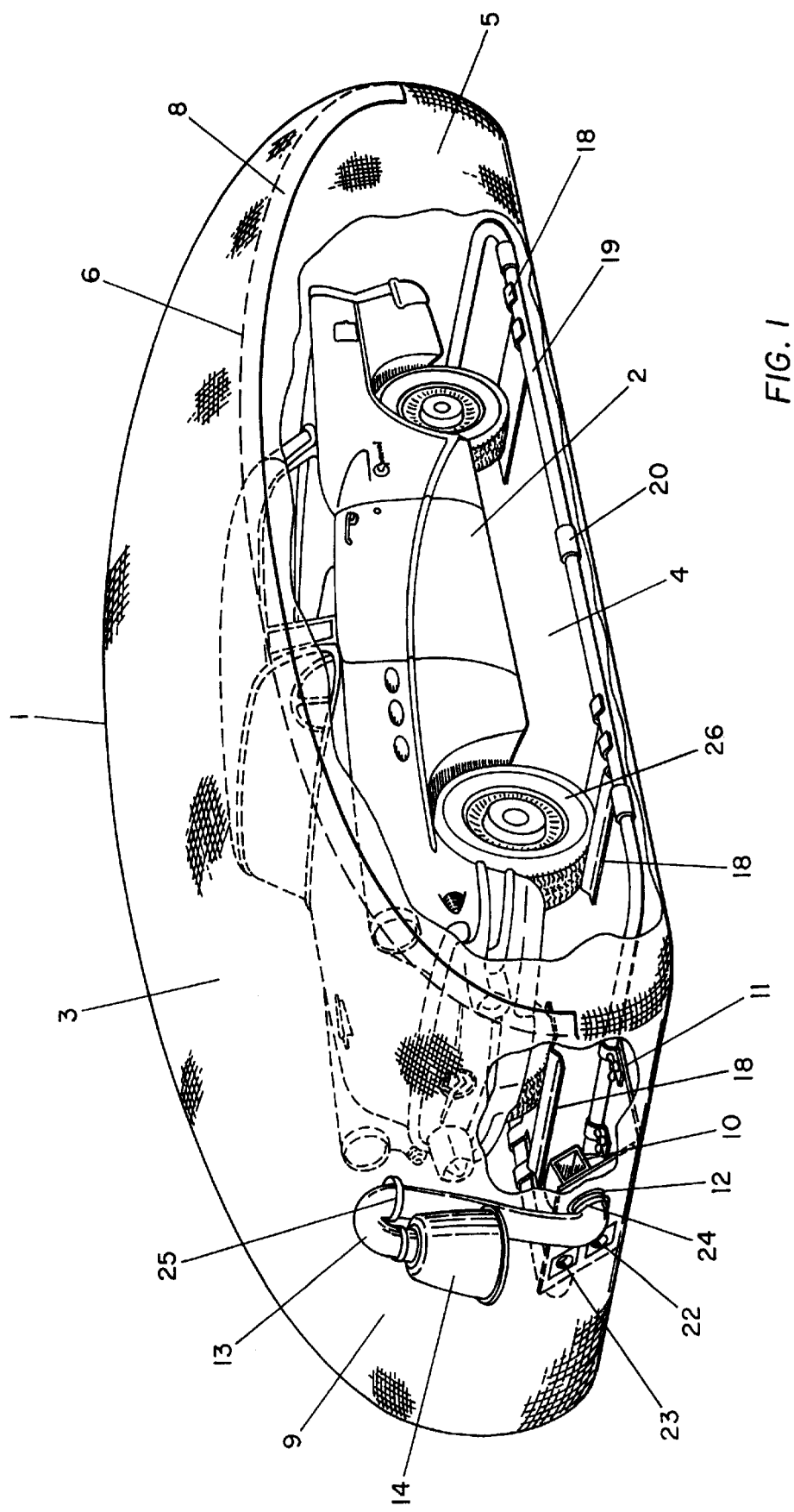
FIG. 1 is a perspective view, from the '363 patent, of the inventor's enclosure on which this invention improves.

With reference to the figures, in FIG. 1, which is taken from the '363 patent, a flexible sheeting 1, preferably made of lightweight, watertight, reinforced vinyl material, encloses totally within it a vehicle 2, such as an automobile. The sheeting 1 comprises a rectangular top portion 3, a rectangular bottom portion 4 and essentially bread-loaf shaped sides 5 joined by sewing or electronic welding technique to form a completely watertight enclosure surrounding the vehicle on all sides, including bottom.

Figure 2:
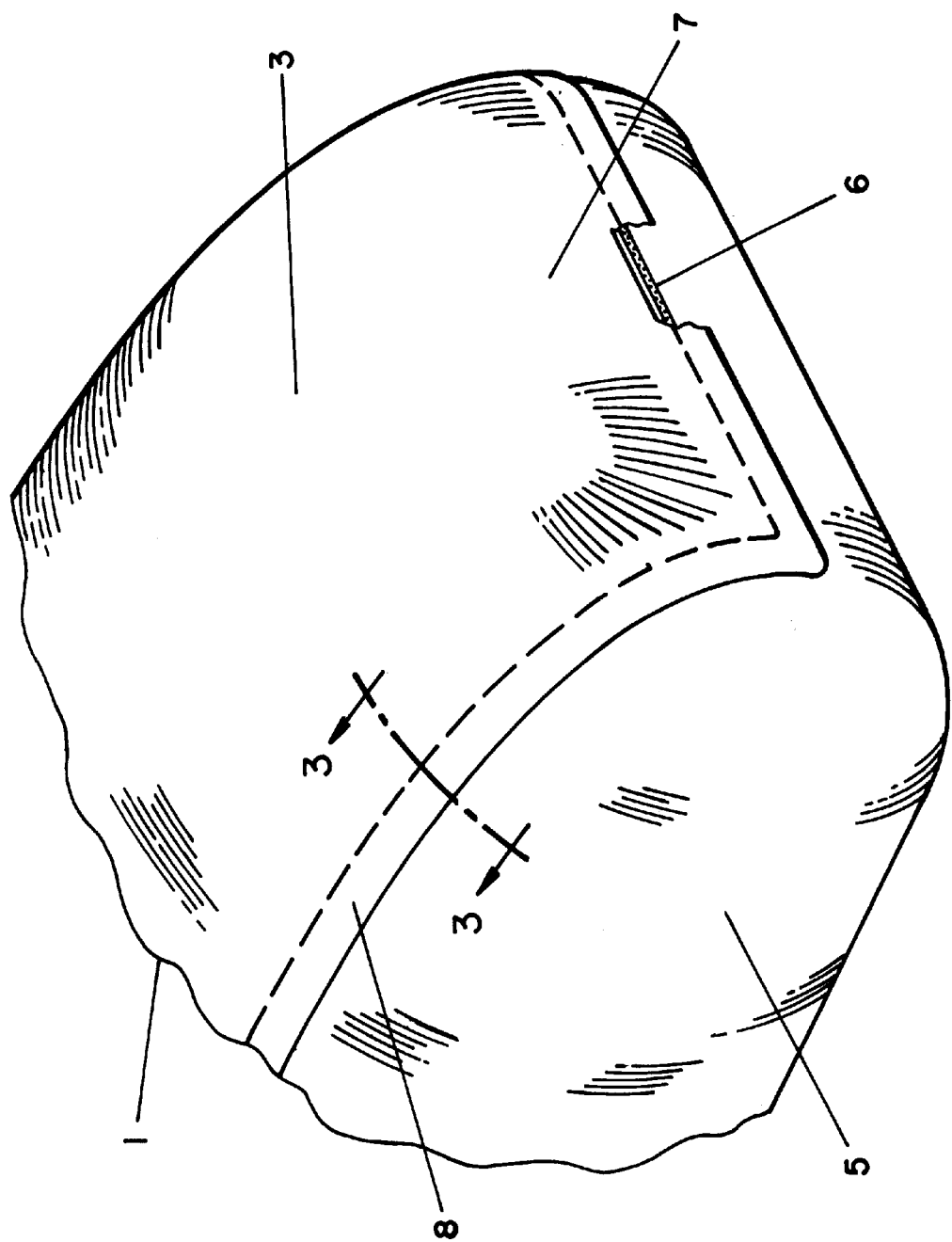
FIG. 2 is a rear perspective view of said enclosure.

A closure means, preferably a heavy duty zipper 6 extending on two sides 5 and rear 7 (FIG. 2) allows when opened access to the interior of the enclosure. An overlapping strip of sheeting material 8 covers the zipper 6 so that water entry is not possible.

Located within the front part of the enclosure 9, a ventilating fan 10 is mounted on a bracket 11 and situated so that its air intake port faces an opening in the enclosure sheeting having a fitting 12 connecting to a flexible ducting 13 leading to a filter housing 14. Ventilating fan 10 pulls air which enters the filter housing 14, flows through filter 17, duct 13, and is discharged by the fan 10 into the interior of the enclosure causing it to become inflated. Once inflated and an equilibrium condition is attained, the airflow is of such magnitude that it equals the leakage through small openings in the enclosure and through the zipper 6 which is designed to leak an amount of air sufficient to ventilate the enclosure. The fan 10 is sized to develop pressure against this fixed airflow to keep the enclosure firmly inflated. In this equilibrium condition the flexible sheeting 1 assumes a semicircular shape in cross section.

Support 18 holds down frame 19 by the weight of the vehicle, the wheels of which rest on supports 18.

Figure 3:
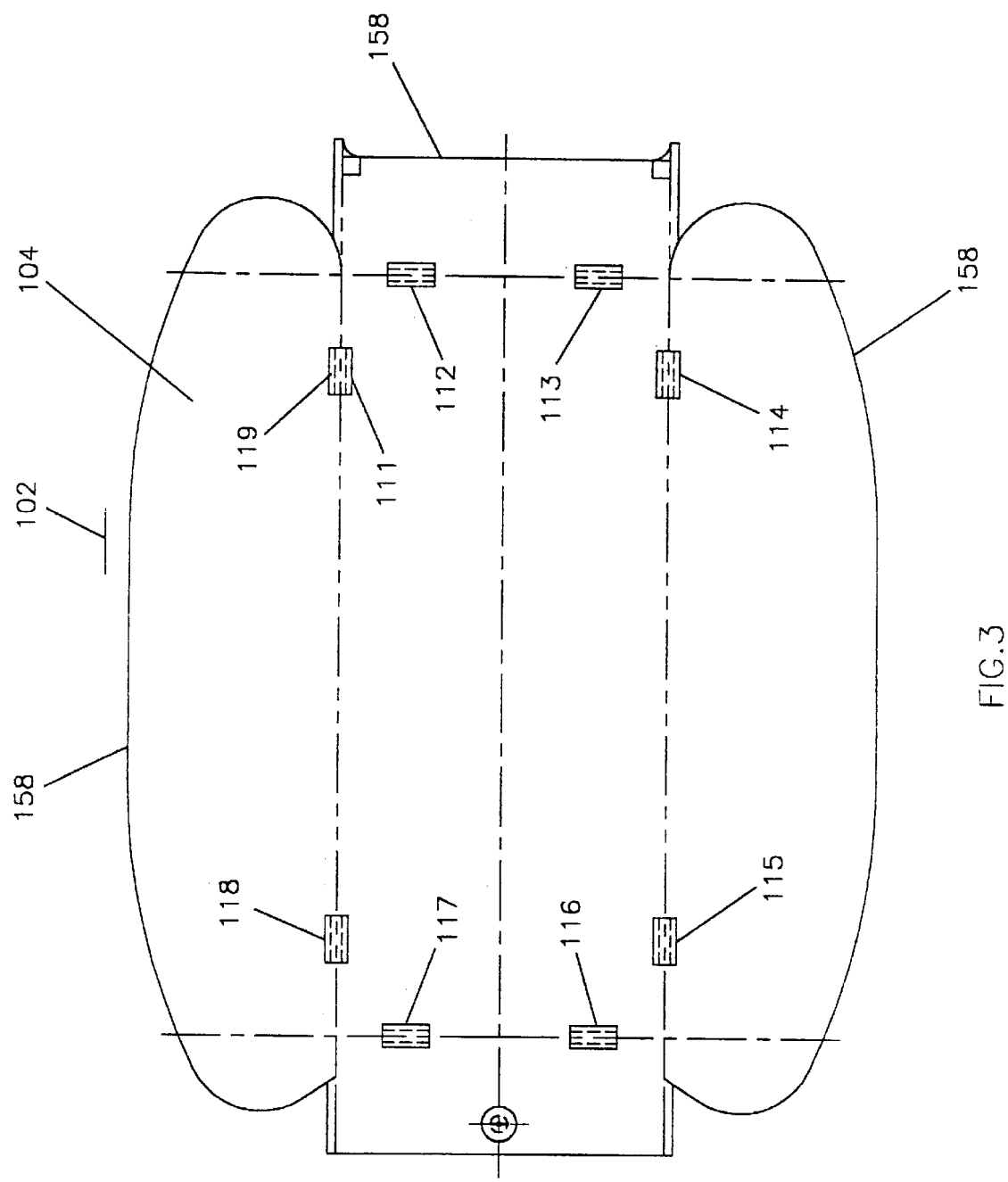
FIG. 3 is a plan view of the bottom part of the material of the enclosure.

For differences between the prior patent of FIG. 1 and the presently preferred embodiment, we refer to FIGS. 3 and 4 et seq.

Turning now to FIG. 3, we see a bottom pattern, generally designated 102, for the fabric 104 of the enclosure. The preferred fabric is a polyester mesh reinforced PVC laminate, such as HERCULITE 10W. The pattern of FIG. 3 is symmetrical about its centerline. The smooth side of the fabric is preferably outside. All seams are heat or electronically welded. Eight belt loop like frame straps 111–118, preferably 4.5"×6" fabric loops, are welded by 0.75" patches 119 to the plastic fabric of bottom pattern 102. As shown in FIG. 4, the base frame 1" diameter pipe or tubing 120 is inserted into these loops and attached together. A plurality of clips 131–136, shown in more detail in FIGS. 6, 7 and 8, are clipped onto base pipe 120 to provide a base for the hoops 140.

Figure 8:
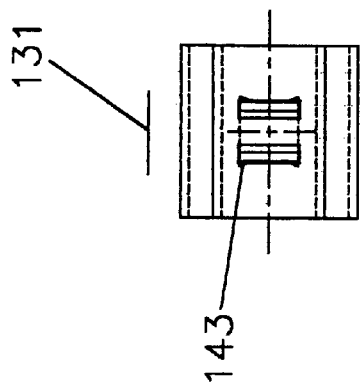
FIG. 8 is a plan view of said clip support.
Figure 7:
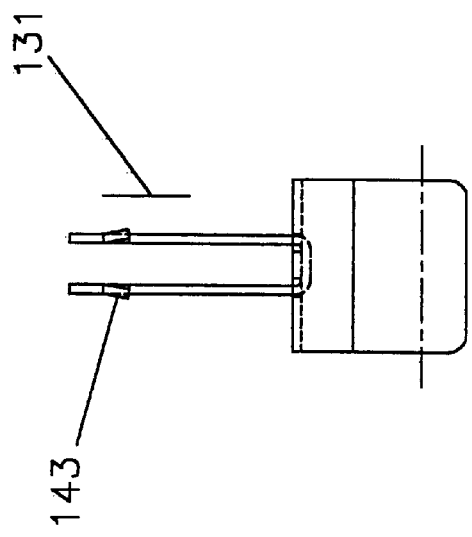
FIG. 7 is a side elevation of said clip support.
Figure 6:
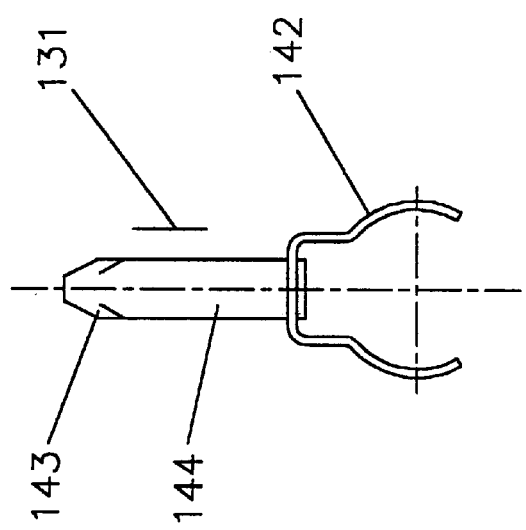
FIG. 6 depicts a front elevation of a clip support used in the present invention.

As shown in FIGS. 6–8, a typical clip 131 comprises a pipe clip 142 and a pintle 144 having a plurality of barbs 143. The pintle end of clip 131 is sized to fit the small end of hoop tubing 140 such that when the barbed end is forced into the tubing, the barbs 143 dig into the tubing interior and prevent disengagement.

Figure 10:
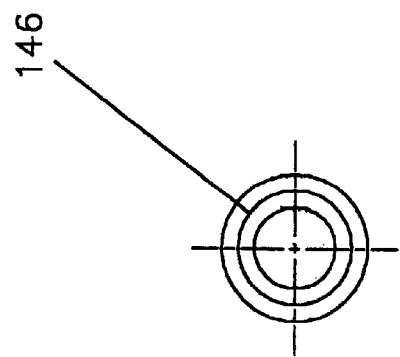
FIG. 10 is a front elevation of said tubing.
Figure 9:
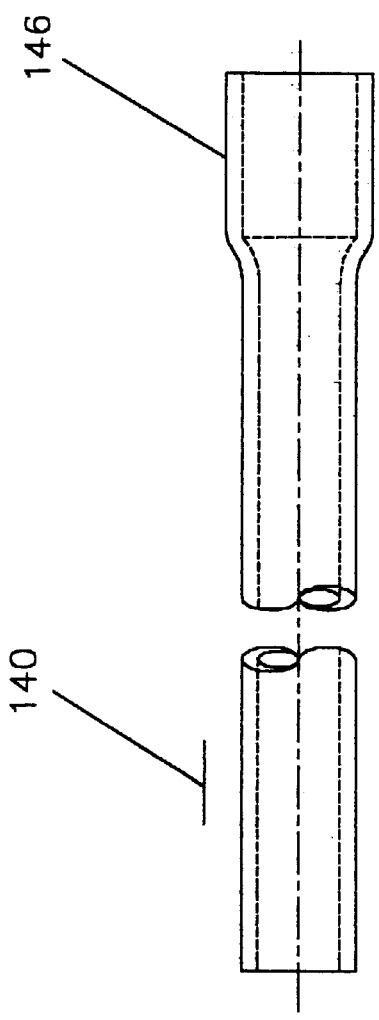
FIG. 9 is a side elevation of a section of a support tubing of the present invention having a flared end.

FIGS. 9 and 10 show a flared end of tubing 146 which is sized to slip over the outside diameter of tubing 140 and is used to extend hoop 140 to various lengths depending on the circumference of a particular enclosure. Typically, two or three lengths of tubing are required to complete one hoop 140. The last section of tubing shown in FIGS. 11 and 12 does not require a flared end.

The hoop 140 holds up the top of the fabric structure even in heavy snow or if the fan fails. Since the clips 131–136 are free to frictionally rotate upon the frame pipe 120, hoop 140 is free to take whatever shape its structure and the forces of the fabric dictate. This shape will generally be circular between the pintles. In this preferred embodiment, there are three hoops 140, but more or fewer may be used.

FIG. 5 shows the top portion of the fabric enclosure. Three fabric loops 151–153 comprise 4.5"×6" fabric hoop loops, which are welded inside to the ridge line of top fabric 148. Before hoops 140 are assembled to frame clips 131–136, the hoops are slipped through loops 151–153 so that there is a hoop 140 in each loop 151–153.

Each hoop 140 has been fitted over a clip such as 132, and bent over to its opposite number such as 135, and pressed onto pintles 144 of clips 132 and 135. This bends the hoop into a semicircular loop spaced at the bottom by the positioning of clips 131–136 and at the top by the position of loops 151–153.

Figure 12:
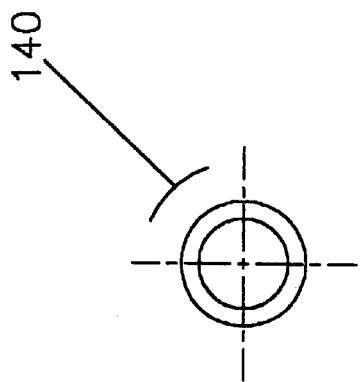
FIGS. 11 and 12 are sectional views of another such tubing without a flared end.
Figure 11:
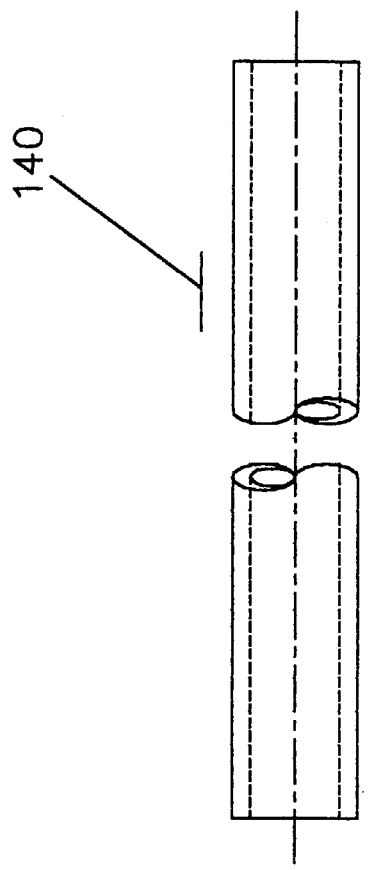

A circumferential side closure such as zipper 156 zips top portion 148 to bottom portion 102, which has a corresponding other half of the circumferential zipper 158. To assemble the top to the bottom, the top half of zipper 156 is zipped to bottom zipper 158. FIGS. 6–8 show various views of the clip 131, identical to clips 132–136, comprising a pipe clip 142 and a pintle 144 which comprises two flat posts and a plurality of barbs 143 protruding from the flat side of each post outward to engage the inside of tubing of hoop 140. FIGS. 9 and 10 show the flared end 146 at one end of hoop section 140. FIGS. 11 and 12 show the hollow flexible tubing which comprises the last of the hoop sections 140.

What is claimed is:

1. In an inflatable protective fabric enclosure for an automobile, said enclosure having a base frame for stabilizing and locating the enclosure, the improvement comprising:

a hoop for supporting the fabric;

the hoop having two ends;

a plurality of frame clips for attaching the hoop ends to the base frame; and each frame clip having a pintle for engaging each end of the hoop.

2. Apparatus according to claim 1, comprising a plurality of barbs on said pintle for securing said frame clip at each end of said hoop.

3. Apparatus according to claim 1, further comprising:

an upper portion of fabric of said enclosure;

a hoop loop fixed to the upper portion of fabric of said enclosure; and said hoop loop is for locating and stabilizing the hoop at a top of the hoop's arc.

4. Apparatus according to claim 3, in which there are a plurality of hoops, and a plurality of hoop loops, each hoop loop is for locating a hoop, and for stabilizing spacing of the hoops, between the hoops.

5. Apparatus according to claim 1, in which each hoop comprises a plurality of sections having means for connecting said sections end to end.

* * * * *